(12) United States Patent
Manzke et al.

(10) Patent No.: US 7,792,347 B2
(45) Date of Patent: Sep. 7, 2010

(54) ARTIFACT REDUCTION

(75) Inventors: Robert Manzke, Husberg (DE); Michael Grass, Buchholz in der Nordheide (DE); Thomas Koehler, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 937 days.

(21) Appl. No.: 11/570,512

(22) PCT Filed: Jun. 14, 2005

(86) PCT No.: PCT/IB2005/051953

§ 371 (c)(1), (2), (4) Date: Dec. 13, 2006

(87) PCT Pub. No.: WO2005/124689

PCT Pub. Date: Dec. 29, 2005

(65) Prior Publication Data

US 2007/0248253 A1 Oct. 25, 2007

(30) Foreign Application Priority Data

Jun. 18, 2004 (EP) .................................. 04102791

(51) Int. Cl.
*G06K 9/00* (2006.01)
*A61B 6/00* (2006.01)
*A61B 5/02* (2006.01)

(52) U.S. Cl. .............................. 382/131; 378/4; 378/21; 600/481

(58) Field of Classification Search ................ 382/128, 382/129, 130, 131, 132, 133, 134, 275; 378/4, 378/8, 21–27, 101, 901, 95, 98.4, 98.5, 98.11; 600/407, 410, 425, 427, 450, 479, 481, 483; 128/920, 922

See application file for complete search history.

(56) References Cited

U.S. PATENT DOCUMENTS

| 5,751,782 | A | * | 5/1998 | Yoshitome | 378/98.5 |
| 6,144,874 | A | * | 11/2000 | Du | 600/413 |
| 6,236,705 | B1 | * | 5/2001 | Stergiopoulos et al. | 378/8 |
| 6,470,208 | B1 | * | 10/2002 | Woodford et al. | 600/428 |
| 6,507,633 | B1 | * | 1/2003 | Elbakri et al. | 378/8 |
| 6,510,337 | B1 | * | 1/2003 | Heuscher et al. | 600/428 |

(Continued)

FOREIGN PATENT DOCUMENTS

WO 99 07283 A1 2/1999

OTHER PUBLICATIONS

Grass, M., et al.; Helical cardiac cone beam reconstruction using retrospective ECG gating; 2003; Phys. Med. Biol.; 48; pp. 3069-3084.

(Continued)

*Primary Examiner*—Abolfazl Tabatabai (57) ABSTRACT

Minimizing the temporal width of the gating window during calculation of the gating function in cardiac CT may not result in best image quality with a maximum of signal-to-noise ratio and minimal artifacts. According to an exemplary embodiment of the present invention, the widths of the gating windows in cardiac CT are selected on the basis of a motion model describing the motion of the heart. According to an aspect of the present invention, the widths of the gating windows are determined by considering the duration of stationary cardiac phases. Thus, artifacts, such as motion artifacts or noise, are minimized.

20 Claims, 4 Drawing Sheets

U.S. PATENT DOCUMENTS 6,535,570 B2 * 3/2003 Stergiopoulos et al. ........ 378/8

OTHER PUBLICATIONS

Manzke, R., et al.; Adaptive temporal resolution optimization in helical cardiac cone beam CT reconstruction; 2003; Med. Phys.; 30(12)3072-3080.

Manzke, R., et al.; Automatic phase point determination for cardiac CT imaging; 2004; Proc. SPIE-Medical Imaging; vol. 5370; pp. 690-699.

Movassaghi, B., et al.; Automatic gating window positioning for 3D rotational coronary angiography (3DRCA); 2004; Proc. SPIE-Image Processing; vol. 5370; pp. 1932-1942.

Wang, G., et al.; A knowledge-based cone-beam x-ray CT algorithm for dynamic volumetric cardiac imaging; 2002; Med. Phys.; 29(8)1807-1822.

* cited by examiner

ARTIFACT REDUCTION

The present invention relates to the field of image processing, for example in medical applications. In particular, the present invention relates to a method of selecting projection data from a projection data set of a moving object of interest for artifact reduction in reconstructed image data, to data processing devices, to CT scanner systems and to respective computer programs.

There is a number of artifacts in cardiac computer tomography (cardiac CT), such as motion artifacts or noise, which limit the image quality in an unfavourable manner. In state-of-the-art reconstruction techniques, artifacts are reduced by calculating the gating function in cardiac CT such that the temporal width of the gating window is minimized in order to obtain highest possible temporal resolution. Unfortunately, optimizing the temporal resolution does not always result in best image quality with a maximum signal-to-noise ratio and minimal artifacts.

It is an object of the present invention to provide for an improved artifact reduction.

In accordance with an exemplary embodiment of the present invention as set forth in claim 1, the above object may be solved by a method of selecting projection data from a projection data set of a moving object of interest for artifact reduction in reconstructed image data, the method comprising the steps of selecting a first phase point and a second phase point of a movement of the object of interest and determining a first width of a first gating window and a second width of a second gating window on the basis of a motion model of the object of interest, wherein the first gating window corresponds to the first phase point and the second gating window corresponds to the second phase point.

In other words, a motion model of the moving object of interest is determined and the widths of the gating windows at the selected phase points are determined by taking into account the motion of the object of interest. Advantageously, the width of a gating window may be bigger, if there is no or only few motion, and the width of the gating window may be smaller, if there is considerable motion present.

According to another exemplary embodiment of the present invention as set forth in claim 2, the object of interest is a heart of a patient and the motion model of the heart is one of a patient specific model on the basis of a motion map and a qualitative model adapted to the heart beat duration of the patient's heart.

Advantageously, this may allow for artifact reduction and therefore for improved image quality of a moving heart. Furthermore, for example by applying a qualitative model on the basis of the heart beat rate, a simple and effective method for determining a motion model and thus for artifact reduction may be provided.

According to another exemplary embodiment of the present invention as set forth in claim 3, the projection data set is acquired by means of a source of electromagnetic radiation generating a beam and by means of a radiation detector detecting the beam, wherein the source of radiation moves around the object of interest.

Advantageously, moving the radiation source around the object of interest may provide for a projection data set comprising projections acquired at different projection angles, which may allow for improved reconstruction methods.

According to another exemplary embodiment of the present invention as set forth in claim 4, the first width of the present invention is determined on the basis of a first duration of a first stable cardiac phase corresponding to the first phase point and the second width of the second gating window is determined on the basis of a second duration of a second stable cardiac phase corresponding to the second phase point. The first duration and the second duration are determined on the basis of the motion model.

Thus, by considering the duration of stationary cardiac phases and therefore eventually enlarging the widths of the gating windows, the image quality may be improved, for example by increasing the signal-to-noise ratio.

Another exemplary embodiment of the present invention is set forth in claim 5, in which the object of interest comprises a plurality of points of interest, wherein the first and second durations are determined on the basis of an evaluation of a similarity between a first and a second cardiac cycle. The first width and the second width are further determined on the basis of a temporal resolution optimization and the first width and the second width are determined such that each point of interest is illuminated by the beam over an interval of at least PI and that the first width and the second width are maximized.

Advantageously, by combining information about the duration of stable cardiac phases with a temporal resolution optimization, the width of the gating windows may be adjusted according to the length of each stable cardiac phase while still maintaining a minimum illumination interval of PI.

According to another exemplary embodiment of the present invention as set forth in claim 6, a first penalty function corresponding to the first phase point and a second penalty function corresponding to the second phase point are determined, on the basis of the motion model. Furthermore, the object of interest comprises a plurality of points of interest and the projection data set comprises a first projection and a second projection, wherein the first projection and the second projection are PI-partner projections of a first point of interest of the plurality of points of interest. The PI-partner projections are separated by an integer multiple of PI, wherein the first width of the first gating window is determined such that the first projection is within the first gating window, if the first penalty function is smaller than the second penalty function.

Thus, during the optimization of the window width of the gating, all so-called PI-partner projections of a voxel under interest are considered and the width of the gating window is chosen such that the PI-partner projection corresponding to the "better" penalty function is within the corresponding gating window. Advantageously, according to this exemplary embodiment of the present invention, the penalty functions reflect the motion of the object of interest at the respective phase points. Thus, the width of the gating windows may be adjusted according to the motion. This may lead to a reduction of motion artifacts.

According to another exemplary embodiment of the present invention as set forth in claim 7, the first penalty function comprises a first local distance between a first motion state of the first point of interest at a first point in time of the first projection and a first reference motion state of the first point of interest at the first phase point. Furthermore, the second penalty function comprises a second local distance between a second motion state of the first point of interest at a second point in time of the second projection and a second reference motion state of the first point of interest at the second phase point.

Advantageously, according to this exemplary embodiment of the present invention, the gating window widths are determined on the basis of the criterion "smallest expected distance from the motion state at the phase point", which may result in an improved artifact reduction.

According to another exemplary embodiment of the present invention as set forth in claim 8, the first penalty function comprises a first weighted average of the first local distance and a first temporal distance between the first phase point and the first point in time of the first projection. Furthermore, the second penalty function comprises a second weighted average of the second local distance and a second temporal distance between the second phase point and the second point in time of the second projection.

Thus, not only information concerning a movement of the object of interest but also information concerning the temporal distance between the time of a selected projection and a reference phase point is considered for an adjustment of the gating windows.

According to another exemplary embodiment of the present invention as set forth in claim 9, the first width and the second width of the gating windows are determined such that each point of interest is illuminated by the beam over an interval of at least PI, which may provide for the application of an exact reconstruction algorithm.

Another exemplary embodiment of the present invention is set forth in claim 10.

According to another exemplary embodiment of the present invention as set forth in claim 11, the source of electromagnetic radiation is a polychromatic x-ray source which moves along a helical path around the object of interest and a source-detector arrangement has one of a cone-beam geometry and a fan-beam geometry.

The application of a polychromatic x-ray source is advantageous, since polychromatic x-rays are easy to generate and provide a good image resolution. It should be noted that the geometry of the CT scanner system may be of different designs, such as, for example, cone-beam or fan-beam geometry, and that a method for an exemplary embodiment of the present invention may be applied to a plurality of different scanner systems and may not be limited to CT scanner systems, but may be applied to PET (positron emission tomography) scanner systems or SPECT (single photon emission computed tomography) scanner systems.

Another exemplary embodiment of the present invention as set forth in claim 12 provides for a data processing device for performing a selection of projection data from a projection data set of a moving object of interest for artifact reduction in reconstructed image data by selecting a first phase point and a second phase point of a movement of the object of interest and determining a first width of a first gating window and a second width of a second gating window on the basis of a motion model of the object of interest, wherein the first gating window corresponds to the first phase point and the second gating window corresponds to the second phase point.

According to another exemplary embodiment of the present invention as set forth in claim 13, a CT scanner system is provided, comprising a memory for storing a data set and a data processor for performing an artifact reduction in a projection data set of a moving object of interest according to an exemplary embodiment of a method according to the present invention.

The present invention also relates to a computer program, which may, for example, be executed on a processor, such as an image processor. Such a computer program may be part of, for example, a CT scanner system. The computer program, according to an exemplary embodiment of the present invention, is set forth in claim 14. The computer program may be preferably loaded into working memories of a data processor. The data processor is thus equipped to carry out exemplary embodiments of the methods of the present invention. The computer program may be written in any suitable programming language, such as, for example, C++ and may be stored on a computer readable medium, such as a CD-ROM. Also, these computer programs may be available from a network, such as the WorldWideWeb, from which they may be downloaded into image processing units or processors, or any suitable computers.

It may be seen as the gist of an exemplary embodiment of the present invention that the width of the gating windows in cardiac CT are selected on the basis of a motion model describing the motion of the heart. According to an exemplary embodiment of the present invention, the width of the gating windows are determined by considering the duration of stationary cardiac phases. According to another exemplary embodiment of the present invention, the width of the gating windows are determined by a penalty function corresponding to the heart movement. Thus, artifacts, such as motion artifacts or noise, are minimized.

These and other aspects of the present invention will become apparent from and will be elucidated with reference to the embodiments described hereinafter.

Exemplary embodiments of the present invention will be described in the following, with reference to the following drawings.

Figure 1:
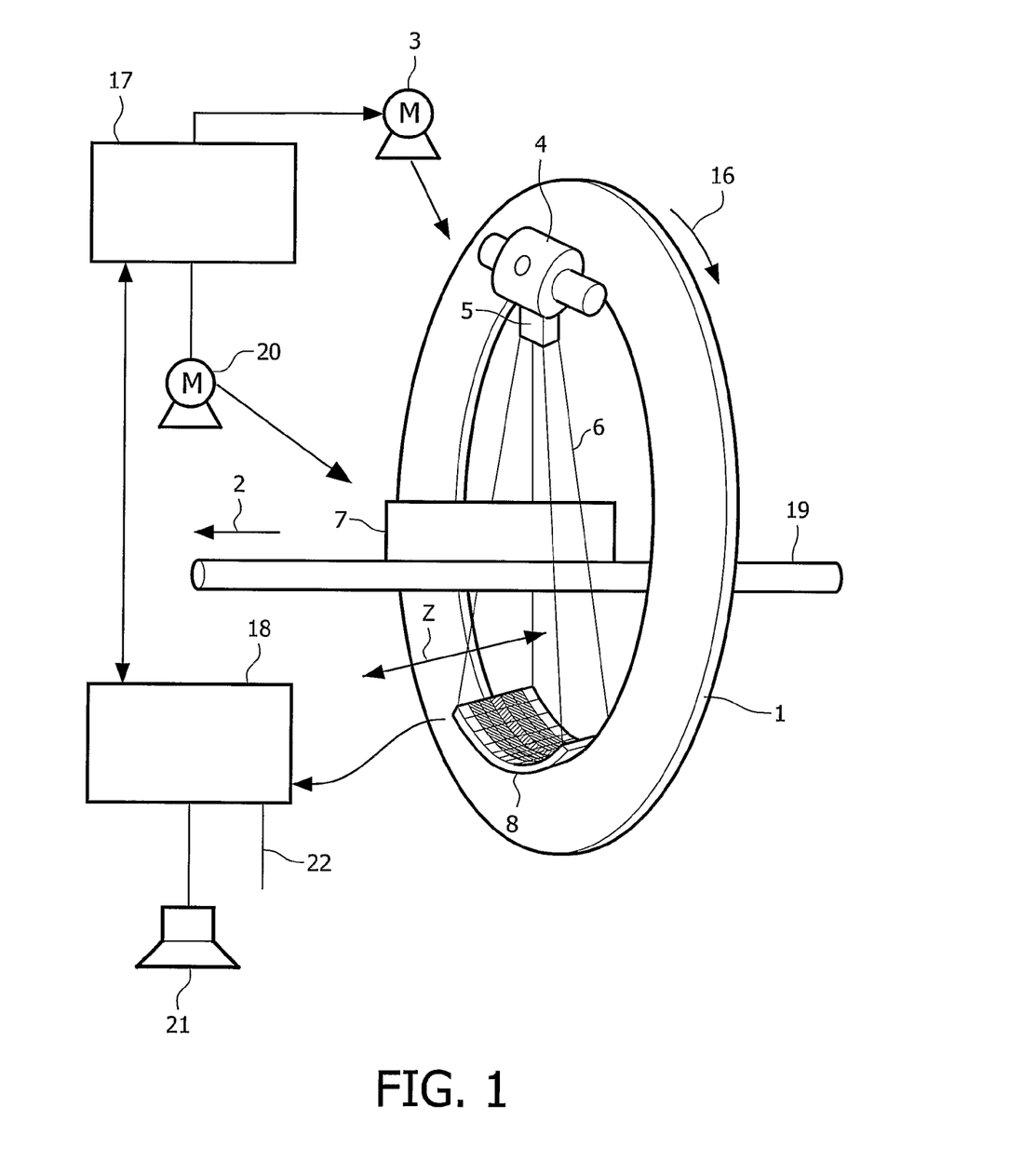
FIG. 1 shows a simplified schematic representation of an embodiment of a computer tomography (CT) scanner according to the present invention.

FIG. 1 shows a simplified schematic representation of an exemplary embodiment of a CT scanner system according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications, such as material testing.

The scanner depicted in FIG. 1 is a cone-beam CT scanner. The CT scanner depicted in FIG. 1 comprises a gantry 1, which is rotatable around a rotational axis 2. The gantry is driven by means of a motor 3. Reference numeral 4 designates a source of radiation, such as an x-ray source, which, according to an aspect of the present invention, emits a polychromatic radiation beam.

Reference numeral 5 designates an aperture system which forms a radiation beam emitted from the radiation source to a cone-shaped radiation beam 6.

The cone-beam 6 is directed such that it penetrates an object of interest 7 arranged in the centre of the gantry 1, i.e. in an examination region of the CT scanner and impinges onto the detector 8. As may be taken from FIG. 1, the detector 8 is arranged on the gantry 1 opposite the source of radiation 4, such that the surface of the detector 8 is covered by the cone-beam 6. The detector 8 depicted in FIG. 1 comprises a plurality of detector elements.

During a scan of the object of interest 7, the source of radiation 4, the aperture system 5 and detector 8 are rotated along the gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

During a scan, the radiation detector 8 is sampled at predetermined time intervals. Sampling results read from the radiation detector 8 are electrical signals, i.e. electrical data, which are referred to as projection in the following. A whole data set of a whole scans of an object of interest therefore consists of a plurality of projections where the number of projections corresponds to the time interval with which the radiation detector 8 is sampled. A plurality of projections together may also be referred to as volumetric data. Furthermore, the volumetric data may also comprise electrocardiogram data.

FIG. 1, the object of interest is disposed on a conveyor belt 19. During the scan of the object of interest 7, while the gantry 1 rotates around the patient 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans. Instead of providing a conveyor belt 19, for example, in medical applications, where the object of interest 7 is a patient, a movable table may be used. However, it should be noted that in all of the described cases it is also possible to perform a circular scan, where there is no displacement in a direction parallel to the rotational axis 2, but only the rotation of the gantry 1 around the rotational axis 2.

The detector 8 is connected to the calculation unit 18. The calculation unit 18 receives the detection result, i.e. the read-outs from the detector element of the detector 8, and determines a scanning result on the basis of the read-outs. The detector elements of the detector 8 may be adapted to measure the attenuation caused to the cone-beam 6 by the object of interest. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit 18 which may be realized by a data processor may also be adapted to perform an artifact reduction in the image based on the read-outs from the detector elements of the detector 8. According to an aspect of the present invention, this artifact compensation or correction may be performed by selecting a first phase point and a second phase point of a movement of the object of interest and determining a first width of a first gating window and a second width of a second gating window on the basis of a motion model of the object of interest, wherein the first gating window corresponds to the first phase point and the second gating window corresponds to the second phase point.

Furthermore, as may be taken from FIG. 1, the calculation unit 18 may be connected to a loudspeaker 21 to, for example, automatically output an alarm.

Figure 2:
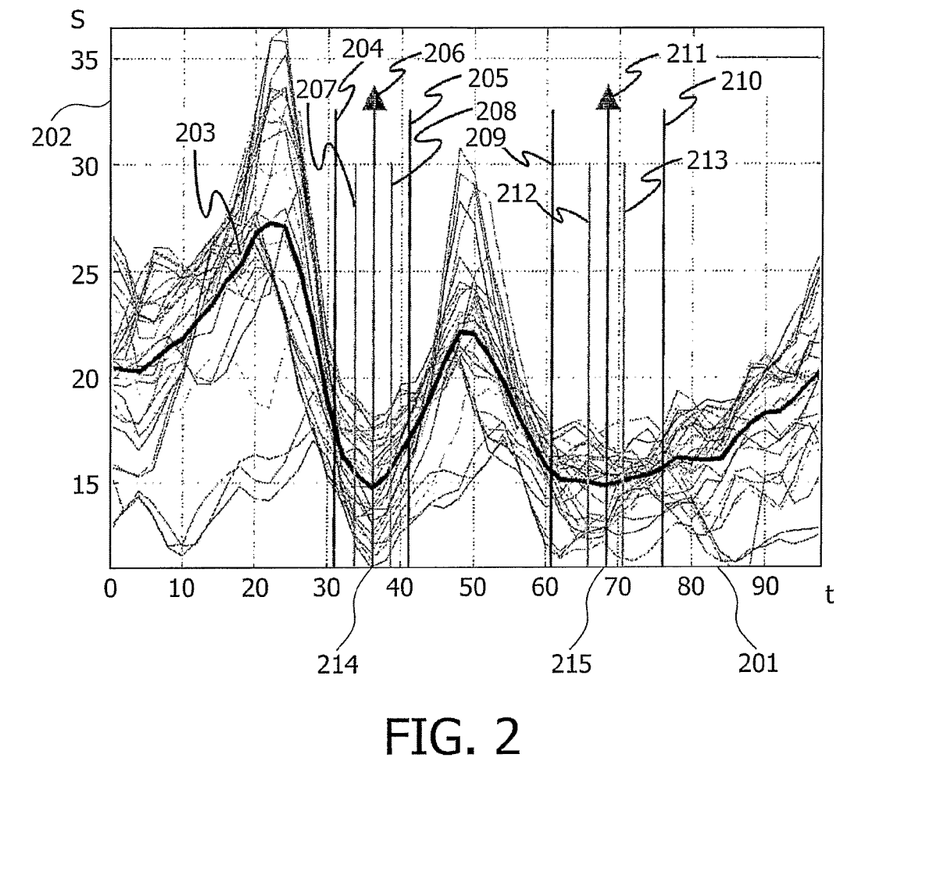
FIG. 2 depicts a motion map showing stable cardiac phases.

FIG. 2 depicts a motion map showing stable cardiac phases. The solid line 203 represents the mean value of the inverse similarity between neighbouring heart cycles. Methods for obtaining such a motion map are well-known in the art and will not be described here in detail. The horizontal axis 201 of FIG. 2 represents the time in % RR-cycle of a heart phase. The horizontal time-axis 201 covers one heart cycle beginning on the left side at 0% RR-cycle and ending at the right side at 100% RR-cycle.

The vertical axis or y-axis 202 shows the inverse similarity of the heart volumes between two consecutive heart cycles. The motion map further represents stable cardiac phases, represented by arrows 206 and 211 and their respective duration, represented by the length of the respective arrows 206, 211. Intervals 207, 208 and 212, 213 represent the gating windows obtained by performing a temporal optimization. In contrast to the temporal optimization, intervals 204, 205 and 209, 210 represent gating windows obtained by performing an optimization according to an exemplary embodiment of the present invention.

The motion map depicted in FIG. 2 may be obtained from data corresponding to a plurality of heart cycles. Thus, the motion map may comprise "global" information about the heart motion. Therefore, according to this exemplary embodiment of the present invention, a respective gating window may be enlarged such that all data corresponding to a stable cardiac phase is considered. And this determined width may now be used for each following heart cycle (at the corresponding phase point).

Using the temporal optimization technique, the projection data is gated such that every reconstructed voxel receives illumination over an interval of at least PI. According to an exemplary embodiment of the present invention, this PI-criterion is kept for the image reconstruction. According to the present invention a first phase point 214 and a second phase point 215 of a movement of the heart or heart cycle are selected. This selection may be performed on the basis of, for example, a motion map describing the motion of the heart, such that the heart is stationary at the selected first and second phase points. Furthermore, again on the basis of the motion model of the heart (e.g. the motion map) the approximate duration of those phases may be determined.

Then, in a second step, the information of the duration of stable cardiac phases is combined with the temporal resolution optimization. As already mentioned above, the first and second durations of the first and second stable cardiac phases 206, 211 are determined on the basis of an evaluation of a similarity between consecutive cardiac cycles. Furthermore, the first width and the second width are further determined on the basis of a temporal resolution optimization, wherein the first width and the second width are determined such that each point of interest is illuminated by a beam over an interval of at least PI. Additionally, according to an aspect of the present invention, by taking into account the duration of each stable cardiac phase 206, 211, the gating windows may be enhanced to a certain maximum, determined by the physical duration of the stable cardiac phases 206, 211 which is derived from, for example, a motion map.

Advantageously, by considering the duration of stable cardiac phases, the width of the gating windows may be enhanced, which may optimize the signal-to-noise ratio by regarding the duration of stable cardiac phases whilst performing the gating. Therefore, image artifacts may be reduced since more projection data may be used compared with temporal optimization alone.

It should be noted that the motion map may comprise more than two stable cardiac phases 206 and 211, or only one stable cardiac phase. However, all stable cardiac phases or a selection of the stable cardiac phases may be taken into account when determining the width of respective gating windows. For example, if there are three stable cardiac phases present, a first phase point may be selected in the first stable cardiac phase, a second phase point may be selected in the second stable cardiac phase and a third phase point may be selected in the third stable cardiac phase. Then, the widths of the respective first, second and third gating windows (which correspond to the first, second and third phase points) are determined on the basis of the duration of the three stable cardiac phases and by keeping the PI-criterion.

Figure 3:
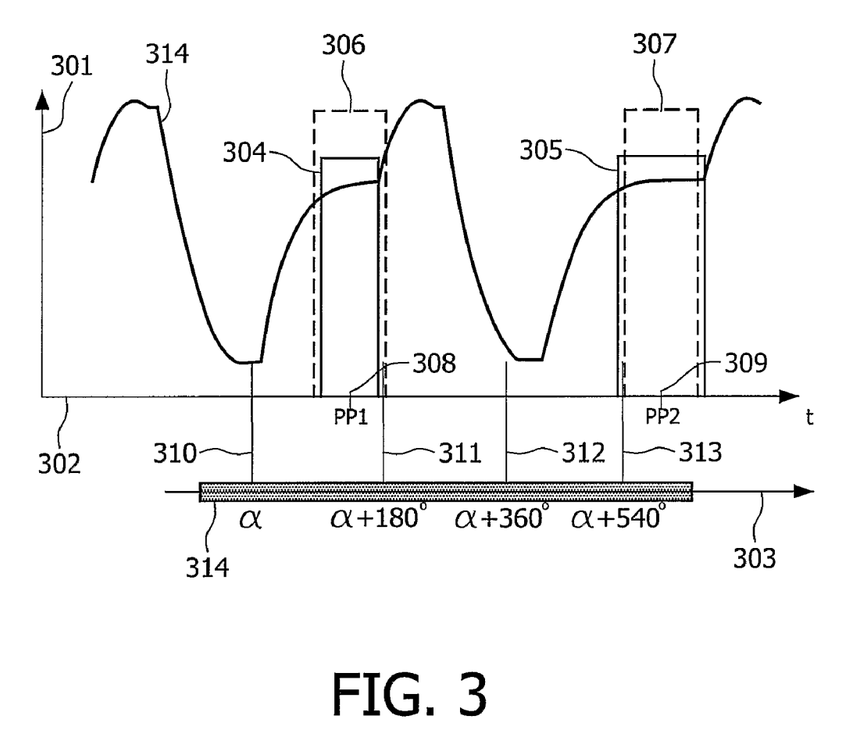
FIG. 3 shows a model of the heart volume of a two heart cycles and two gating windows.

FIG. 3 depicts a model of the heart volume over two heart cycles and two gating windows. According to the present invention, two phase points are determined, such as first phase point 308 and second phase point 309.

The horizontal axis 302 represents a time of the cardiac cycle and the vertical axis 301 represents the heart volume.

According to an aspect of the present invention, the model of the heart may be a patient specific model which may be for example based on a motion map or it may be a qualitative model which may be based for example on electrocardiogram data and adapted to reflect the heart beat duration. The projection data set may be acquired by means of a source of electromagnetic radiation generating a beam and by means of a radiation detector detecting the beam, such as a CT scanner system. In this case, the source of radiation moves around the object of interest (heart) and may be a polychromatic x-ray source. The movement of the source around the heart of the patient may be along a helical path and the source-detector arrangement may have a cone-beam geometry or a fan-beam geometry.

After selecting the first phase point 308 and second phase point 309, which represent points in time of only little heart motion, a first penalty function which corresponds to the first phase point 308 and a second penalty function which corresponds to the second phase point 309 are determined. The penalty functions may be determined on the basis of the motion map or, which is the case depicted in FIG. 3, on the basis of the qualitative model of the heart volume which may be derived on the basis of, for example, the heart beat rate.

As may be seen from FIG. 3, the model of the heart volume covers two heart cycles 314. According to the model, the longer duration of the second beat leads mainly to a prolongation of the diastolic phase, where the phase point 309 is assumed to be located.

During a second step, the first width of the first gating window 304 and the second width of the second gating window 305 are optimized on the basis of the motion model of the heart. During the optimization of the window width, the difference of the heart volume at the selected phase points 308, 309 from the actual point in time is used as a penalty function. For example, the width of the window at the second phase point 309 is increased while the width of the first gating window 304 at the first phase point 308 is decreased compared with the gating windows resulting from a pure temporal optimization 307, 306.

In other words, during the optimization of the window width of the gating, all so-called PI-partner projections of a voxel or point of interest of the object of interest (heart) are considered and the width of the gating window is chosen such that the PI-partner which has the smallest expected distance from the motion state at the phase point is within the window. In contrast to the temporal optimization, the criterion "smallest temporal distance" is replaced by the criterion "smallest expected distance from the motion state at the phase point".

Axis 303 represents the projection angle a. Bar 314 represents the illumination interval of a certain voxel or point of interest. The PI-partners, which fall inside the illumination interval of a certain voxel are represented by lines 310, 311, 312 and 313. The PI-partner projections are separated by an integer multiple of PI. According to an aspect of the present invention, the window width of each gating window 304, 305 is chosen such that at least one of these projection angles 310, 311, 312, 313 is covered. Thus, each point of interest or voxel is illuminated by the beam over an interval of at least PI.

When broadening the windows around the phase points 308, 309, either α+180° 311 or α+540° 313 will be inside the gating windows first. Contrary to temporal optimization, where it is enforced that the window around the first phase point 308 covers α+180° 311 (symbolized by temporal optimization gating window 306), because this projection angle is temporally closer to the first phase point 308 than the projection α+540° 313 is to the second phase point 309, according to an exemplary embodiment of the present invention the distance from the reference motion state is considered. With respect to motion, α+540° 313 is closer to second phase point 309 than α+180° 311 to first phase point 308. Consequently, the consideration of this angle a enforces that the window 305 around phase point 309 covers α+540° 313.

Therefore, artifacts, such as motion artifacts, may efficiently be reduced.

The first and second penalty functions which are considered for determining the width of the first and second gating windows may, for example, comprise not only the local distances between respective motion states at the respective points in time and the reference motion states at phase points 308, 309, but also a weighted average of the respective local distances and the temporal distances. Therefore, instead of optimizing strictly according to the motion, the penalty function used during optimization of the gating windows comprises a weighted average of the local distance and the temporal distance.

For a phase point in the diastolic phase, for example, the model may be as simple as just minimizing the window width in units of % RR after application of a delay algorithm. The delay algorithm is for example described in "Multi-phase cardiac imager" by Heuscher and Chandra, U.S. Pat. No. 6,510,337 (2003), which is hereby incorporated by reference.

It should be noted that FIG. 3 shows a motion model for consecutive heart cycles. In order to reconstruct the whole volume of projection data, data from each (single) heart cycle are considered individually. Therefore, projection data corresponding to a first heart cycle may be preferentially used for image reconstruction, since this first heart cycle may comprise a long stable cardiac phase, while only few projection data corresponding to a second heart cycle may be considered for image reconstruction, since this second heart cycle may comprise only a short stable cardiac phase.

Again, it should be noted that the motion model may comprise more than two phase points 308 and 309, which represent points in time of only little heart motion or stable cardiac phases, or only one such phase point. However, all such phase points or a selection of such phase points may be taken into account when determining the width of respective gating windows. For example, if there are three stable cardiac phases (and thus three such phase points) present, the widths of the respective first, second and third gating windows (which correspond to the first, second and third phase points) are determined on the basis of the respective penalty functions under the condition that each point of interest is illuminated by the beam over an interval of at least PI.

Furthermore, it should be noted that a patient specific model for the motion may be derived by analyzing motion maps obtained from, e.g., multi-phase reconstruction.

Figure 4:
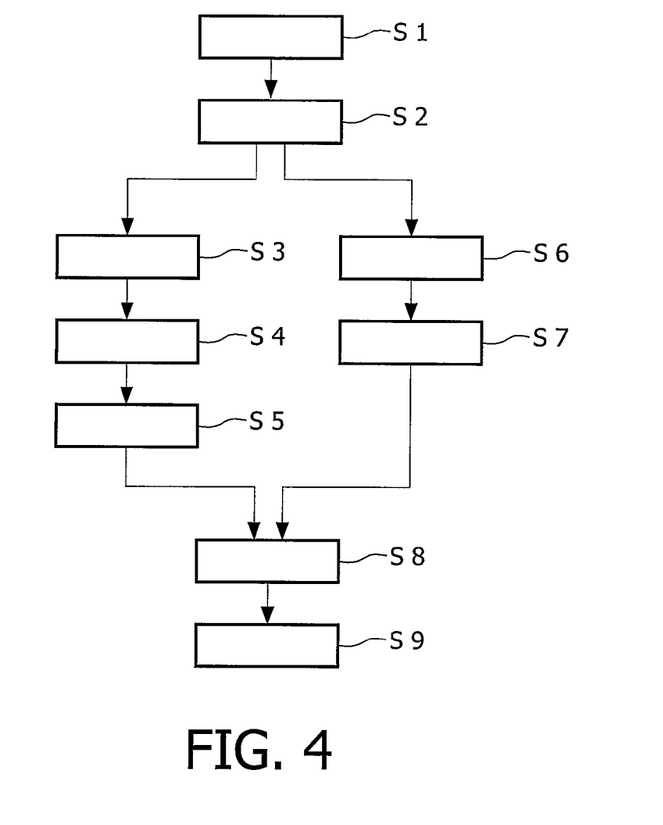
FIG. 4 shows a flow-chart of an exemplary embodiment of a method according to the present invention.

FIG. 4 shows a flow-chart of an exemplary embodiment of a method of artifact reduction according to the present invention. The method starts at step S1 with an acquisition of a projection data set. This may, for example, be performed by using a suitable CT scanner or by reading the projection data from a storage. In a subsequent step S2, a first phase point and a second phase point of a movement of the object of interest are selected.

Then, in step S3, a first projection and a second projection of a certain voxel or point of interest are selected, wherein the first projection and the second projection are PI-partner projections of the first point of interest which are separated by an integer multiple of PI.

Then, in step S4, a first penalty function which corresponds to the first phase point and a second penalty function which corresponds to the second phase point are determined on the basis of a motion model.

The first penalty function comprises a first weighted average of a first local distance (which is the local distance between a first reference motion state of the first point of interest at the first phase point and a first motion state of the first point of interest at a first point in time of the first projection) and a first temporal distance between the first phase point and the first point in time of the first projection. Furthermore, the second penalty function comprises a second weighted average of the second local distance (which is the local distance between a second reference motion state of the first point of interest at the second phase point and a second motion state of the first point of interest at a second point in time of the second projection) and a second temporal distance between the second phase point and the second point in time of the second projection.

After that, in step S5, the first width of the first gating window is determined such that the first projection is within the first gating window, if the first penalty function is smaller than the second penalty function. In other words, if the first projection is the better candidate for a projection used for image reconstruction, the first projection is, according to an exemplary embodiment of the present invention, covered by the first gating window and the second projection, which is a PI-partner projection of the first projection, is not necessarily covered by the second gating window. On the other hand, if the first penalty function is bigger than the second penalty function, the width of the second gating window is adjusted such that the second gating window covers the second projection. In that case, the first projection is not necessarily covered by the first gating window. In case the first penalty function is equal to the second penalty function, the first gating window may be adjusted such that it covers the first projection or the second gating window may be adjusted such that it covers the second projection.

However, according to an exemplary embodiment of the present invention, the first width and the second width of the first and second gating windows are determined such that it each point of interest is illuminated by the beam over an interval of at least PI.

Alternatively, after selection of the first and second phase points, the duration of a first stable cardiac phase corresponding to the first phase point and the duration of a second stable cardiac phase corresponding to the second phase point are determined, for example, on the basis of a patient specific model on the basis of a motion map (step S6). Then, in step S7, the first width of the first gating window is determined on the basis of the first duration and on the basis of a temporal resolution optimization. Furthermore, the second width of the second gating window is determined on the basis of the second duration and on the basis of the temporal resolution optimization. In other words, the projection data is gated such that every reconstructed voxel receives illumination over an interval of at least PI and that the first width and the second width are maximized.

In step S8, a reconstruction of the selected projection data (which lies inside the gating widows) is performed and the method ends in step S9.

Figure 5:
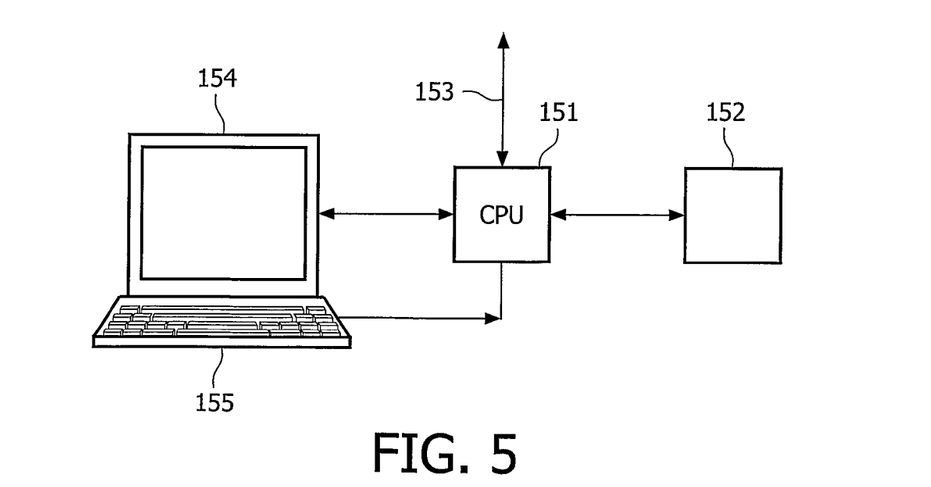
FIG. 5 shows an exemplary embodiment of an image processing device according to the present invention for executing an exemplary embodiment of a method in accordance with the present invention.

FIG. 5 depicts an exemplary embodiment of a data processing device according to the present invention for executing an exemplary embodiment of a method in accordance with the present invention. The data processing device depicted in FIG. 5 comprises a central processing unit (CPU) or image processor 151 connected to a memory 152 for storing an image depicting a moving object of interest, such as the heart of a patient. The data processor 151 may be connected to a plurality of input/output network or diagnosis devices, such as an MR device or a CT device. The data processor may furthermore be connected to a display device 154, for example, a computer monitor, for displaying information or an image computed or adapted in the data processor 151. An operator or user may interact with the data processor 151 via a keyboard 155 and/or other output devices, which are not depicted in FIG. 5.

Furthermore, via the bus system 153, it may also be possible to connect the image processing and control processor 151 to, for example, a motion monitor, which monitors a motion of the object of interest. In case, for example, a lung of a patient is imaged, the motion sensor may be an exhalation sensor. In case the heart is imaged, the motion sensor may be an electrocardiogram (ECG).

The invention claimed is:

1. A method of selecting projection data from a projection data set of a moving object of interest for artifact reduction in reconstructed image data, the method comprising the steps of:
    selecting with a processor a first phase point and a second phase point of a movement of the object of interest;
    determining with a processor a first width of a first gating window and a second width of a second gating window on the basis of a motion model of the object of interest;
    wherein the first gating window corresponds to the first phase point and the second gating window corresponds to the second phase point;
    wherein the first width of the first gating window is determined on the basis of a first duration of a first stable cardiac phase corresponding to the first phase point and the second width of the second gating window is determined on the basis of a second duration of a second stable cardiac phase corresponding to the second phase point; and
    wherein the first and second durations are determined on the basis of an evaluation of a similarity between a first and a second cardiac cycle.

2. The method of claim 1,
    wherein the object of interest is a heart of a patient; and
    wherein the motion model of the heart is one of a patient specific model on the basis of a motion map and a qualitative model adapted to a heart beat duration.

3. The method of claim 2,
    wherein the first duration and the second duration are determined on the basis of the motion model.

4. The method of claim 3,
    wherein the object of interest comprises a plurality of points of interest;
    wherein the first width and the second width are further determined on the basis of a temporal resolution optimization; and
    wherein the first width and the second width are determined such that each point of interest is illuminated by a beam over an interval of at least PI and that the first width and the second width are maximized.

5. The data processing device of claim 3,
    wherein the object of interest comprises a plurality of points of interest;

wherein the first width and the second width are further determined on the basis of a temporal resolution optimization; and wherein the first width and the second width are determined such that each point of interest is illuminated by a beam over an interval of at least PI and that the first width and the second width are maximized.

6. The method of claim 1, wherein the projection data set is acquired by means of a source of electromagnetic radiation generating a beam and by means of a radiation detector detecting the beam; and wherein the source of radiation moves around the object of interest.

7. The method of claim 6, further comprising the step of:

determining a first penalty function corresponding to the first phase point and a second penalty function corresponding to the second phase point;

wherein the first and second penalty functions are determined on the basis of the motion model;

wherein the object of interest comprises a plurality of points of interest;

wherein the projection data set comprises a first projection and a second projection;

wherein the first projection and the second projection are PI-partner projections of a first point of interest of the plurality of points of interest;

wherein the PI-partner projections are separated by an integer multiple of PI; and wherein the first width of the first gating window is determined such that the first projection is within the first gating window, if the first penalty function is smaller than the second penalty function.

8. The method of claim 7, wherein the first penalty function comprises a first local distance between a first motion state of the first point of interest at a first point in time of the first projection and a first reference motion state of the first point of interest at the first phase point; and wherein the second penalty function comprises a second local distance between a second motion state of the first point of interest at a second point in time of the second projection and a second reference motion state of the first point of interest at the second phase point.

9. The method of claim 8, wherein the first penalty function comprises a first weighted average of the first local distance and a first temporal distance between the first phase point and the first point in time of the first projection; and wherein the second penalty function comprises a second weighted average of the second local distance and a second temporal distance between the second phase point and the second point in time of the second projection.

10. The method of claim 8, wherein the first motion state corresponds to a first heart volume at the first point in time of the first projection;

wherein the reference motion state corresponds to a second heart volume at the first phase point;

wherein the first local distance corresponds to a first difference between the first heart volume and the second heart volume; and wherein the first and the second heart volumes are determined on the basis of the motion model.

11. The method of claim 7, wherein the first width and the second width are determined such that each point of interest is illuminated by the beam over an interval of at least PI.

12. The method of claim 1, wherein the source of electromagnetic radiation is a polychromatic x-ray source;

wherein the source moves along a helical path around the object of interest; and wherein a source-detector arrangement has one of a cone beam geometry and a fan beam geometry.

13. A data processing device, comprising:

a memory for storing a data set;

a data processor for performing a selection of projection data from a projection data set of a moving object of interest for artifact reduction in reconstructed image data, wherein the data processor is adapted for performing the following operation:

loading the data set acquired by means of a rotating source of electromagnetic radiation generating a beam and by means of a radiation detector detecting the beam;

selecting a first phase point and a second phase point of a movement of the object of interest;

determining a first width of a first gating window and a second width of a second gating window on the basis of a motion model of the object of interest;

wherein the first gating window corresponds to the first phase point and the second gating window corresponds to the second phase point wherein the first width of the first gating window is determined on the basis of a first duration of a first stable cardiac phase corresponding to the first phase point and the second width of the second gating window is determined on the basis of a second duration of a second stable cardiac phase corresponding to the second phase point; and wherein the first and second durations are determined on the basis of an evaluation of a similarity between a first and a second cardiac cycle.

14. The data processing device of claim 13, wherein the object of interest is a heart of a patient; and wherein the motion model of the heart is a patient specific model on the basis of a motion map.

15. The data processing device of claim 13, wherein the object of interest is a heart of a patient; and wherein the motion model of the heart is a patient specific model on the basis of a qualitative model based on electrocardiogram data adapted to a heart beat duration.

16. The data processing device of claim 13, wherein the projection data set is acquired by means of a source of electromagnetic radiation generating a beam and by means of a radiation detector detecting the beam; and wherein the source of radiation moves around the object of interest.

17. The data processing device of claim 16, wherein the data processor is further adapted to perform the following operation:

determining a first penalty function corresponding to the first phase point and a second penalty function corresponding to the second phase point;

wherein the first and second penalty functions are determined on the basis of the motion model;

wherein the object of interest comprises a plurality of points of interest;

wherein the projection data set comprises a first projection and a second projection;

wherein the first projection and the second projection are PI-partner projections of a first point of interest of the plurality of points of interest;

wherein the PI-partner projections are separated by an integer multiple of PI; and wherein the first width of the first gating window is determined such that the first projection is within the first gating window, if the first penalty function is smaller than the second penalty function.

18. The data processing device of claim 13,
wherein the first duration and the second duration are determined on the basis of the motion model.

19. A CT scanner system, comprising:
a memory for storing a data set;
a data processor for performing a selection of projection data from a projection data set of a moving object of interest for artifact reduction in reconstructed image data, wherein the data processor is adapted for performing the following operation:
   loading the projection data set acquired by means of a rotating source of electromagnetic radiation generating a beam and by means of a radiation detector detecting the beam;
   selecting a first phase point and a second phase point of a movement of the object of interest;
   determining a first width of a first gating window and a second width of a second gating window on the basis of a motion model of the object of interest;
wherein the first gating window corresponds to the first phase point and the second gating window corresponds to the second phase point
wherein the first width of the first gating window is determined on the basis of a first duration of a first stable cardiac phase corresponding to the first phase point and the second width of the second gating window is determined on the basis of a second duration of a second stable cardiac phase corresponding to the second phase point; and
wherein the first and second durations are determined on the basis of an evaluation of a similarity between a first and a second cardiac cycle.

20. A non-transitory computer-readable medium containing computer executable instructions, that when executed on a processor of the computer, performs a method of selection of projection data from a projection data set of a moving object of interest for artifact reduction in reconstructed image data, the method comprising the following acts:
   loading the data set acquired by means of a rotating source of electromagnetic radiation generating a beam and by means of a radiation detector detecting the beam;
   selecting a first phase point and a second phase point of a movement of the object of interest;
   determining a first width of a first gating window and a second width of a second gating window on the basis of a motion model of the object of interest;
wherein the first gating window corresponds to the first phase point and the second gating window corresponds to the second phase point;
wherein the first width of the first gating window is determined on the basis of a first duration of a first stable cardiac phase corresponding to the first phase point and the second width of the second gating window is determined on the basis of a second duration of a second stable cardiac phase corresponding to the second phase point; and
wherein the first and second durations are determined on the basis of an evaluation of a similarity between a first and a second cardiac cycle.

* * * * *